Figure 1:
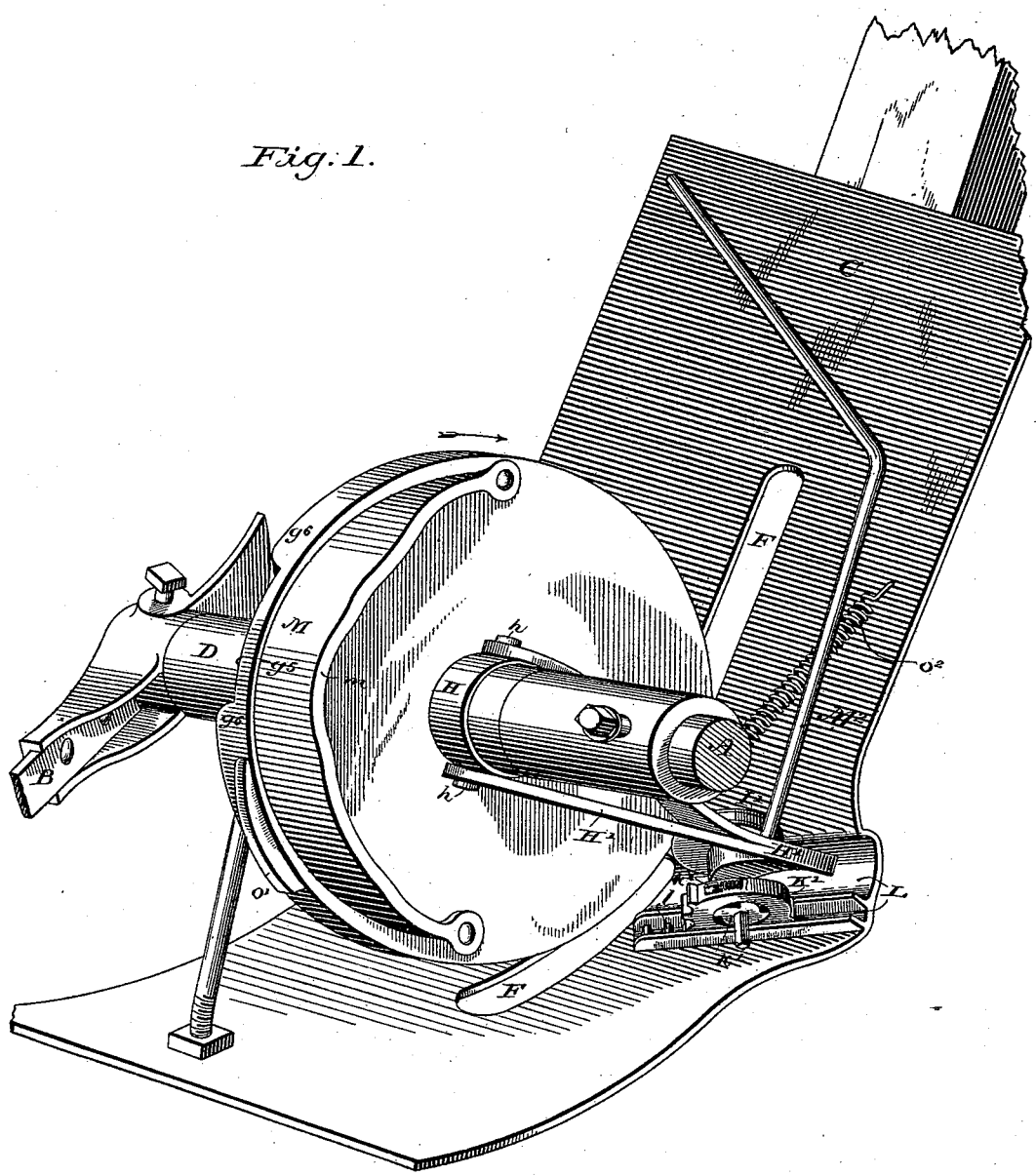

(No Model.)  5 Sheets—Sheet 1.

G. L. PHELPS.
TWINE BINDER.

No. 494,708. Patented Apr. 4, 1893.

Witnesses  
Wm A. Skinkle  
Geo. W. Young

Inventor  
George L. Phelps.  
By his Attorneys (No Model.) 5 Sheets—Sheet 3.

G. L. PHELPS.
TWINE BINDER.

No. 494,708. Patented Apr. 4, 1893.

Witnesses
Wm. A. Skinkle
Geo. W. Young

Inventor
George L. Phelps.
By his Attorneys
Rasmussen & Dickinson (No Model.) 5 Sheets—Sheet 4.

G. L. PHELPS.
TWINE BINDER.

No. 494,708. Patented Apr. 4, 1893.

Witnesses
Wm. A. Skinkle
Geo. W. Young.

Inventor
George L. Phelps.
By his Attorneys (No Model.) 5 Sheets—Sheet 5.

G. L. PHELPS.
TWINE BINDER.

No. 494,708. Patented Apr. 4, 1893.

Witnesses
Wm A. Skinkle
Geo. W. Young.

Inventor
George L. Phelps.
By his Attorneys
Parkinson & Parkinson

UNITED STATES PATENT OFFICE.

GEORGE L. PHELPS, OF SYCAMORE, ASSIGNOR TO THE McCORMICK HARVESTING MACHINE COMPANY, OF CHICAGO, ILLINOIS.

TWINE-BINDER.

SPECIFICATION forming part of Letters Patent No. 494,708, dated April 4, 1893.

Application filed December 26, 1883. Serial No. 115,538. (No model.)

*To all whom it may concern:*

Be it known that I, GEORGE L. PHELPS, a citizen of the United States, residing at Chicago, in the county of Cook (formerly of Sycamore) and State of Illinois, have invented certain new and useful Improvements in Grain-Binders, of which the following is a specification.

In the modern type of binder the tying-bill, when in a state of rest, stands with its jaws in about a horizontal position, that is to say, in a position at right angles, or nearly so, to the line of discharge of the bound sheaf. With this arrangement more or less difficulty has always been encountered in the matter of stripping the twine therefrom after the knot has been formed, and in tightening said knot in this stripping action. In some forms of machines this difficulty has been overcome by the employment of a stripper which pulls the knot from the jaws by a tug or forcible strain in the direction of their length, causing the loop to slip over the nose of said jaws and leave the bight grasped therein to be wrenched therefrom, as the sheaf is ejected. In others for the purpose of stripping the knotter has either been momentarily stopped on reaching the line of discharge and the sheaf at that instant pushed out, drawing upon the cord in the direction of the length of the jaws, and in still others, the tying bill after reaching its normal position, completely forming the knot, has reversed its movement until its jaws have become parallel with the line of discharge when the sheaf has been ejected, the knot stripped and tightened and the bill instantly returned to its position of rest. With both of the latter constructions the stripping and tightening of the knot are effected by the discharge of the sheaf itself, the slot in the breast-plate through which the binder-arm or knotter plays, being for that purpose lengthened and unobstructed to permit the stress on the cord to come in line with the length of the knotting jaws. With both, however, since the normal position and the position for stripping are not coincident, auxiliary mechanism has been necessary either to check the progress of the knotter for a brief period at the proper time—or to reverse it and carry it back for a like brief period after it has reached its normal position.

In my present invention I bring the knotter to a stop when it has reached a position when its jaws are pointing outwardly practically parallel with the needle-slot in the breast-plate and leave it at rest, as in its normal position, at that point and continue the slot beyond such point, so that when the sheaf is ejected the strain may come in a direct line with the jaws of the knotter and the loop therefore pull easily off and tighten upon the bight, while the latter is still retained in said jaws, and finally this bight forcibly drawn therefrom.

In binders of this type it is also desirable, where the knotter is arranged behind the breast-plate on the upper side of the receptacle or binding chamber, and the cord delivered to it by a needle which rises through said chamber, that the cord should be supported on the inner side of the knotter until the revolution of the latter has commenced; otherwise, the stress will cause it to slip off of the jaws of the knotter if it has been laid thereon, even when the knotter stands at right angles to the line of the cord. If, however, the jaws are parallel with that line the necessity for such a support until the revolution has so far progressed as to gather them and insure against their accidental escape, is obviously imperative. Heretofore the arm which serves as a stripper has usually performed the office of such a stop or support, although either a swinging or reciprocating cord-gate or else a fixed gate barring the needle slot inside of the knotter has been employed. With all of these however, there has existed one drawback:— they have not permitted the cord to accommodate itself to the movement of the knotter when stress is greatest, but have held it practically fixed in position at the point of stop between the sheaf and knotter, with the exception perhaps of the reciprocating gate, which is elastically yielding. This however opposes resistance to the knotter and throws unnecessary labor upon it. I propose in regard to this feature to employ as a cord-stop, or support in said slot a rigid finger projecting from the side thereof farthest from the tying bill transversely across the slot toward said bill, but permitting the cord to be carried laterally along its upper edge as the bill gathers it in and revolves, and finally, by the continued revolution of this bill, to be passed over or beneath its end, entering into the lower or outer portion of the slot beyond said finger. In connection with this cord-stop and with the knotter I also prefer to employ a holder mounted in a swinging frame that is actuated prior to the movement of the knotter and during the initial stage of such movement to carry said holder away from the needle-slot, thus moving the cord laterally along the cord-stop a part of its length and also carrying it over the knotter jaws and against the shank of said knotter and partly bending it past said shank, whereby the purpose of the cord-stop and the action of the knotter are better carried out.

Various other features and details of construction forming parts of my invention will be understood from the ensuing description and from the claims.

Figure 2:
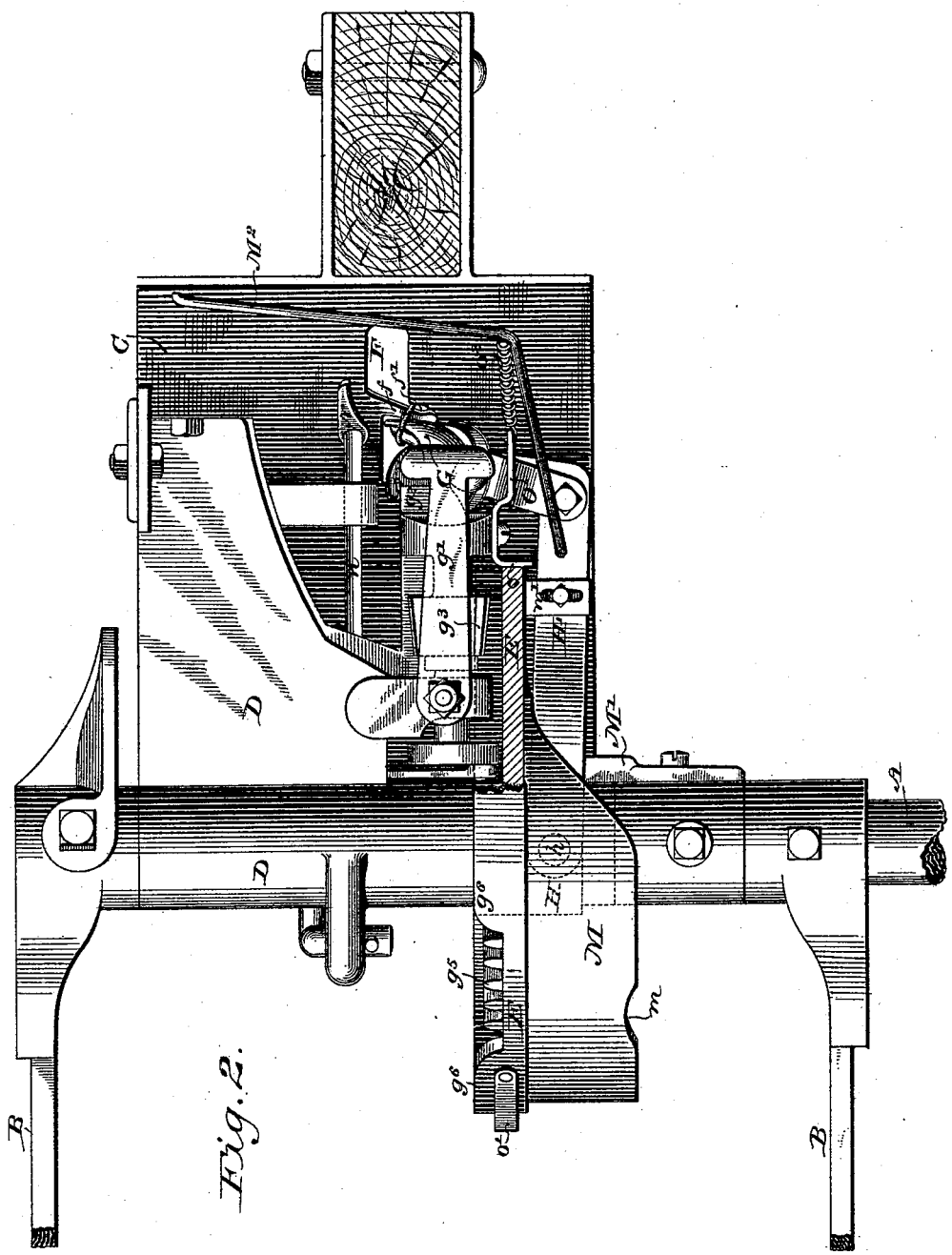
Figure 3:
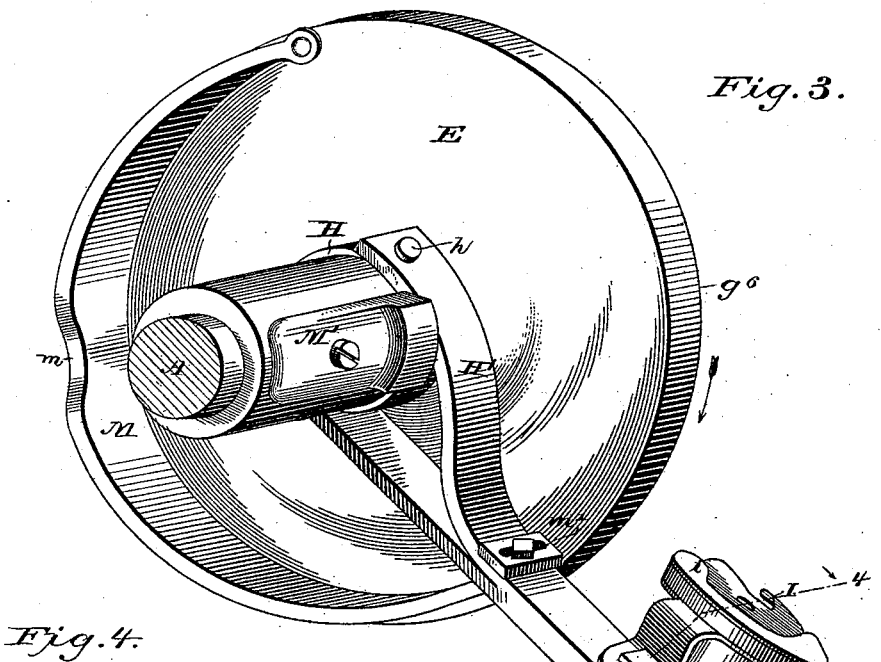
Figure 4:
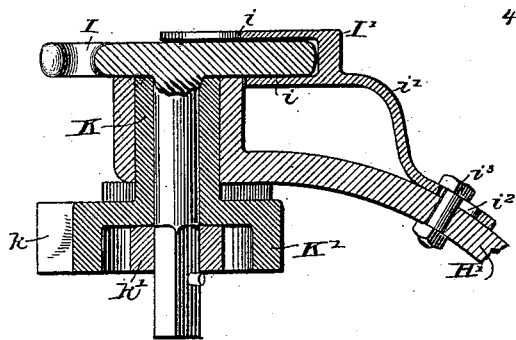
Figure 6:
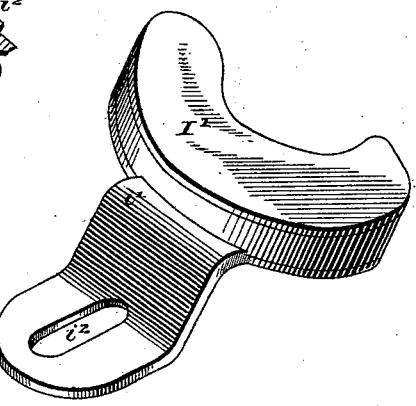
Figure 5:
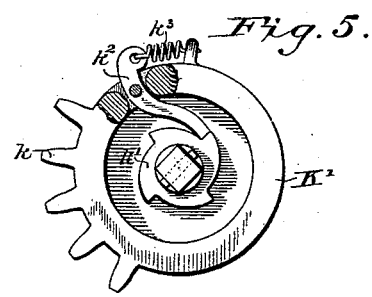
Figure 7:
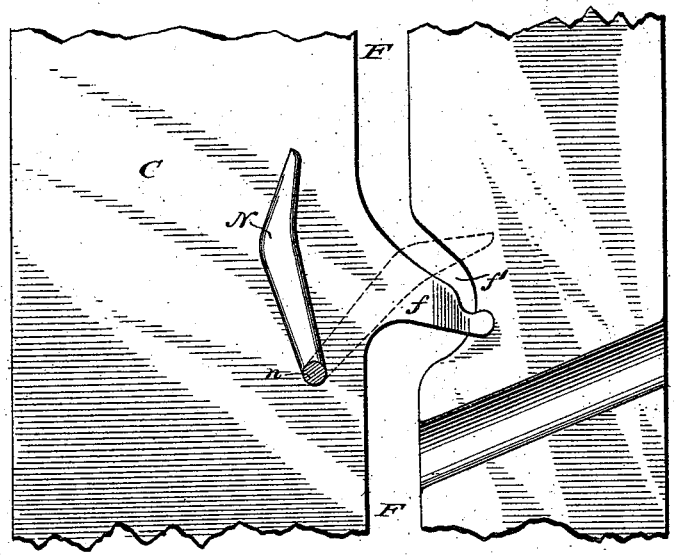
Figure 8:
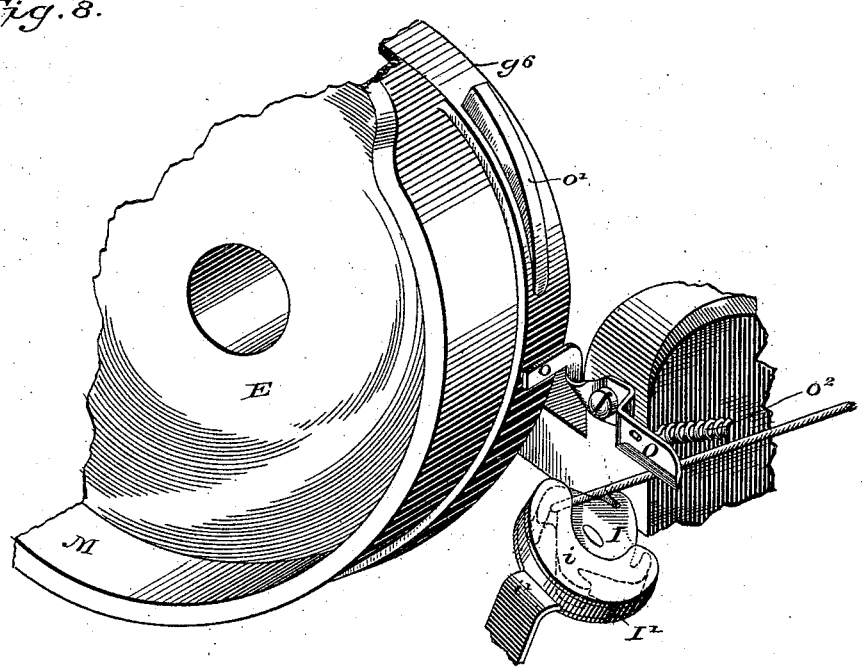
Figure 9:
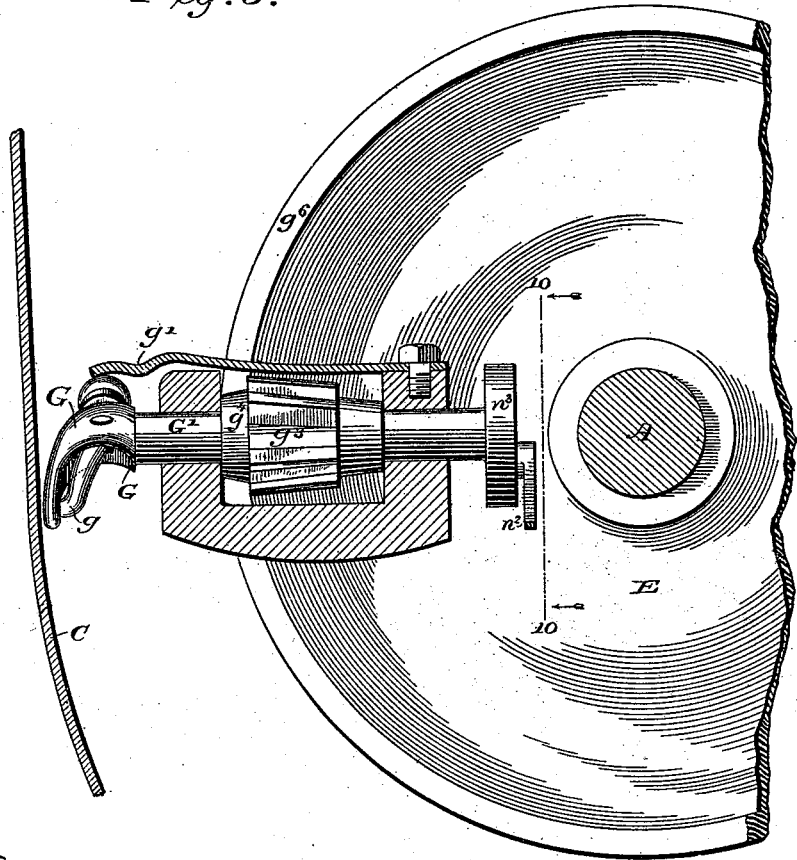
Figure 11:
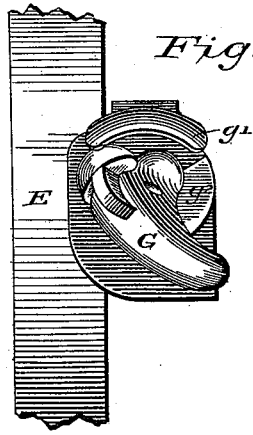
Figure 10:
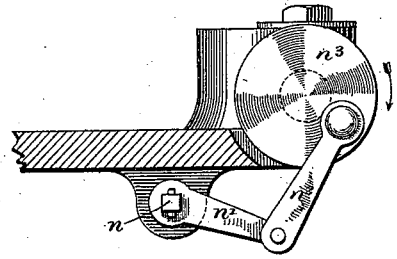

In the drawings: Figure 1, is a perspective view of my device. Fig. 2, is a plan view of the same. Fig. 3, is a perspective view detached, of the gear-and-cam-wheel operating the lever, cord-holder and cord-holding disk. Fig. 4, is a section of the cord-holding mechanism taken on the line 4—4 of Fig. 3. Fig. 5, is a detached view, in elevation, of the gear-and-cam-wheel with its stop-motion gear, showing connection thereto, the ratchet and dog which operate the cord-holding disk. Fig. 6, is a perspective view of the cord-holder case detached. Fig. 7, is a front elevation of a portion of the breast-plate, showing the needle-slot therein, and the fixed guide-finger for the cord, and showing the tucker in a state of rest, and also, by dotted lines, in position to cary the cord down to the guide finger. Fig. 8, is a perspective view of the cord-cutter and attendant parts, showing its position with relation to the cam-disk and cord-holder. Fig. 9, is a longitudinal section taken through the knotter-spring and bearing, showing the interior construction. Fig. 10, is a section, taken on the line 10—10 of Fig. 9, showing the pitman connection which operates the tucker form the knotter shaft; and Fig. 11, is an end elevation of the knotter and its immediate connections, showing its position when in a state of rest.

A is the binder-shaft, B the sheaf discharging fingers on said shaft and carried around thereby when it makes an intermittent rotation upon being tripped.

C is the breast-plate, D the supporting bracket for the inner end of said shaft and for the knotter and its accessory parts, and E is the gear-and-cam-wheel by which said knotter and the cord-holder and certain other parts are actuated, all of these being, for the purpose of this description, of the usual form.

A slot F is always formed in the breast-plate, for the point of the binder-arm to play through in order to pass the knotter and reach the cord-holder, but this slot, as already explained, has extended only from the upper or inner side of the breast-plate to a point just beneath the knotter, and has there terminated in machines of the type illustrated, and in other machines has been continued straight along the decking or breast-plate, of the same width for the whole distance. I however carry this slot for some distance beyond the knotter, that the sheaf as it is ejected may more certainly pull the knot from the jaws of said knotter or tying-bill, and just inside of or beneath the knotter provide a stop-finger $f$ projecting from the decking at that side of the slot farthest from the knotter, over toward said knotter and past the general line of the adjacent edge of the slot. Beneath this finger the proximate side of the slot is cut away to permit the cord to be carried along the finger laterally and to form a guard $f'$ which keeps said cord in contact with the inner edge of the finger. This finger as shown in the drawings, is oblique downward and outward from its base but it may occupy a position at right angles with the slot. It may overlap the decking beyond the cut away portion slightly but will be raised thereabove, so that the cord carried therealong by the action of the holder and of the knotter, as hereinafter explained, will slip beneath the end and pass on the lower side of the finger and into the continuation of the slot just as the knot has been completely laid and the crossed ends seized in the jaws of the knotter, and therefore, when the knotter comes to rest, may be free to be forced down along the slot with the ejection of the sheaf.

The knotter G is of the usual tying-bill form common in machines now upon the market, having a pivoted inner jaw $g$ with a rounded or bulbous heel-extension acted upon by the spring cam $g'$ to close it against the other and by a fixed cam $g^2$ upon the supporting stock or bracket to open it at the proper time. The spring-cam is secured upon the bracket with its shank parallel with the spindle of the knotter, and the cam part at right angles to said shank, thus economizing space and also giving an equable pressure throughout the effective contact of the movable jaw, since such contact is not continued toward the base of the spring from the initial point, as in former structures.

G' has the usual pinion $g^3$ and delay shoes $g^4$ for alternate engagement with the segment-rack $g^5$ and delay-ledge $g^6$ on the face of the gear-and-cam-wheel, whereby it is intermittently rotated and held at rest, but, instead of the relative arrangement of pinion and rack, delay-shoe and ledge being such as to stop the knotter with its jaws running nearly across the slot in the decking, and partly inward, as hertofore in machines of this type, it is herein made to stop the knotter with its jaws trending outward in the direction of the length of the continued slot and practically parallel therewith, although so slightly oblique thereto as to bring the nose of the jaws over said slot and toward the center thereof.

This is its position of rest and the position from which it starts at the beginning of the knotting operation and to which it is carried in forming the knot, and not beyond, there to remain at rest until the succeeding binding operation. Thus when the sheaf is discharged, the knot up to that time grasped in the jaws of the knotter will be pulled therefrom by a direct pull in the direction of their length, first slipping the loop off of the curved and convex surface of said jaws and then pulling the end from between them in opposition to the elastic pressure placed upon them by the spring cam.

Upon the hub of the gear-and-cam-wheel alongside that face of said wheel opposite to the segment-rack and delay-ledge or practically upon the binder-shaft is mounted a sleeve H to which is hinged a swinging arm H' by means of pivot-pins $h$ diametrical of the shaft. This arm extends down to a point beyond the periphery of the wheel and outside of the knotter, in close proximity to the inner surface of the breast-plate, and at its free end receives and supports the spindle of the cord-holder disk I which turns in a shoe or clamping plate I' and as usual carries the cord into said shoe and wedges it therein. This shoe is formed practically of a segmental case $i$, partly inclosing the disk on each side and at the edge and secured to the swinging arm by a brace $i'$ which is adjustable upon said arm by means of a slot $i^2$ and a bolt $i^3$ toward and from the disk, so that in case the sides of the shoe which are of thin elastic metal, yielding under the pressure of the cord, and readily conform to different thickness thereof become slightly sprung as they are liable to in time, so that the cord will not be held with sufficient firmness, the shoe may be set up more closely to the periphery of the disk.

The holder-disk lies in a plane almost at right angles with the adjacent portion of the breast-plate instead of parallel or nearly parallel thereto, as in previous constructions of this type and it is not placed across the end of the slot in said breast-plate, as heretofore, so as to receive the cord on a line forming a continuation of the slot and almost diametrical of the disk, but when receiving the cord one edge projects over the slot nearly or quite to the opposite side thereof and the cord is laid by the binder-arm upon this edge. The regular notches heretofore formed in holder-disks would therefore be uncertain and would permit the cord to escape. The teeth of said disk are therefore hooked as shown so as to form sockets in which the cord may lie and be received, and assure that it shall not escape when the disk is carried away from the slot, as presently explained.

The spindle of the holder-disk is not journaled directly in the end of the swinging-arm but passes through a short sleeve-shaft K which has its bearing directly in the arm and has on the opposite side of the arm a disk or wheel K' cupped in its outer face and having a segmental series of gear teeth $k$ upon its periphery and projecting therefrom. Within the cup or recess the spindle of the holder-disk receives a ratchet $k'$ made fast therewith and in an aperture through the rim of the wheel is pivoted a dog $k^2$ forged into engagement with the ratchet by means of the coiled spring $k^3$ acting on its heel-extension.

Upon the breast-plate opposite the free end of the swinging arm are guides L one of which embraces the sides of the segment spur-wheel and has for a portion of its length, adjacent to the cord-slot in the breast-plate, a rack $l$, the other guide alongside thereof simply permitting the play of the holder. These guides, it will be observed, trend inwardly and upwardly along the breast-plate toward the head of the elevator, so that the holder as it moves therealong will lift the cord into position to enter the open jaws of the knotter.

The face of the gear-and-cam-wheel adjacent to the swinging arm has a cam-ledge M which commences and terminates a short distance on either side of the segment by which the tying-bill is revolved and is slightly cut away at $m$, a little past the center of said segment. This cam-ledge acts to force the arm away from the cord slot just before the action of said bill, and during its action, except as it sinks into the recess $m$, to render up slack at a certain point in the revolution of the bill, and to permit it to return to its position of rest in proximity to said slot, at the end of the tying action. A second cam M' secured to the binder-shaft and revolved therewith on the opposite side of the arm, acts upon the arm to carry it positively back as soon as permitted by the retreat of the primary arm. The free end of the swinging arm should be supported in some method to prevent too great friction between the segment-spur-wheel of the holder and the way on which it travels, and this is conveniently done by a suspension rod $M^2$ universally jointed near the head or inner end of the breast-plate, and also to said arm.

In the play of the swinging arm, as it is forced outward by means of its primary cam and segment-spur-wheel is revolved a quarter of a revolution, or so, by means of the engagement of its gear teeth with the rack in the bottom of its guide way, the effect of this being to turn the ratchet pinion, and the cord-holding disk to which it is attached, a corresponding distance through engagement of the driving dog, and thereby clamp the cord, which has been laid in the teeth of the holder-disk prior to the initial movement, firmly within the shoe. When the swinging arm is returned to its normal position by means of the second cam the dog rides over the ratchet teeth and leaves the holder-disk stationary and held in position by means of the cord wedged between it and the shoe. It is however important to insure sufficient motion to the actuating wheel in this return movement to carry the dog far enough back to drop behind a tooth of the ratchet pinion as the arm comes to rest, and ready to be engaged therewith in the next outward traverse. The proper degree of sweep to effect this easily may be regulated by means of an adjustable contact plate $m'$ upon the swinging arm, to receive the impulse of the primary cam. As this plate is adjusted toward or from the cam it will of course change or alter the sweep of the arm.

I propose to use a cord tucker N in connection with the stop-finger or cord-stop across the slot in the breast-plate, although so far as the action of the stop in relation to the other parts is concerned this tucker may be dispensed with. Such tucker, if used, is arranged to play across the slot above, or in advance of, the stop-finger to press the cord down against said finger, and bear it therealong in case the finger is oblique. It is mounted upon the end of a shaft or spindle $n$ supported in the main bracket alongside the knotter shaft. It is essential that the tucker when used shall, at precisely the right moment, descend upon the cord, carrying it down into such position that it shall be caught by the knotter as the latter is in the first part of its revolution and then, having performed its work, shall return to its normal position. This I effect by operating the tucker from the spindle of the knotter through the medium of the fixed crank $n'$, upon the end of the tucker-shaft, which terminates opposite the end of the knotter spindle, and link, $n^2$, connecting the crank with a pin upon the wrist-wheel $n^3$ keyed to the adjacent end of said knotter spindle.

Upon the main bracket, adjacent to the bearing of the knotter-spindle, or in any other suitable position, close to and a little above the cord-holder or above the path of the cord-holder, is pivoted a knife O having a heel-extension $o$, which is acted upon by the cam $o'$ upon the periphery of the gear-and-cam-wheel at the proper moment, in such manner as to carry the edge of the knife down upon the cord. In the construction shown the return of the knife to its normal position is effected by means of a spring $o^2$ but it may also be effected by a cam-action or by analogous mechanism.

In order that the operation of my device may be fully understood, it should be stated that the general movement of the needle, and the method of tying the knot through the medium of the revolving knotter and cord-holding device, are all substantially the same in my device as in other machines in which a knotter analogous to mine is employed, as above stated. It is not deemed necessary, therefore, to enter into a minute description of these movements for forming the knot, nor of the mechanism by which they are effected; nor has it been deemed necessary to show the needle and attendant parts in the drawings, since they are in all respects the same as in other binders referred to, and in their construc- tion and mode of operation are well understood by all persons skilled in the art; but, since my improvements are confined to certain auxiliary mechanisms and arrangements of parts, above described, by which the operations of tying the knot, holding and cutting the cord, and stripping the knot from the knotter, are greatly simplified and rendered more accurate than heretofore, I shall in describing the operation, assume that the fundamental principles of the machine are understood, and confine myself mainly to the new features. With this qualification, a description of the operation is as follows: The mechanism being in a state of rest the lower cord or strand left by the preceding retreat of the binder-arm, and grasped at its end in the cord-holder, which is now alongside the slot, lies upon the upper edge of the stop-finger; the knotter is pointing obliquely outward along the continuation of the slot and its jaws are closed with the heel of the movable jaw resting in the spring-cam and the cord-tucker is open, as represented in the second figure of the drawings. The binder-arm now rises through the slot, bringing the spool-strand of the cord with it and laying it over the stop-finger and into one of the notches of the holder-disk, then the swinging-arm carrying the holder, begins to move from the slot in the breast-plate, rotating the holder-disk which grasps both the new strand and the old strand already grasped but bent thereover. This lateral movement of the holder-disk, as well as its revolving movement, lifts the cord and carries it against the shank of the knotter, slipping it partly along the stop-finger in so doing. Then the knotter commences to revolve, the swinging arm concurrently ceasing its movement. In the first part of its revolution the knotter sets in motion the tucker which comes down upon the two strands of cord lying upon the stop-finger and forces them therealong somewhat farther than they have been carried by the swinging holder, and next they are caught by the knotter-jaws, which in the continued revolution carry them both over the end of the finger just about the time that the end strands are grasped between said jaws, the cord holder yielding during the last part of the revolution under the tension of the cord by entering the cut away part in the cam which gives the outward movement to its swinging supporting arm, thus affording slack and permitting the knotter to continue to the end of its revolution and form the knot without pulling the cord out of the holder. As the knotter completes its revolution with the cord ends firmly grasped between its jaws, the holder again goes outward slightly tightening the cord to facilitate the operation of cutting. Then the knife comes into action, the ends are severed and the ejecting fingers come around pushing the sheaf from the receptacle, stripping the knot from the jaws of the knotter or tying-bill, tightening and completing it.

While many of the mechanical combinations above described for producing movements corresponding to those produced in analogous machines, are believed to be improvements upon the ones used before, and are therefore claimed herein, still such mechanical details form only subordinate features of my present invention.

The leading features of my invention lie in the new relative movements which I produce in the various parts, without special reference to the mechanisms by which the said movements are produced, and, this being the case, I do not limit myself, so far as the new movements are concerned, to any specific mechanisms for producing them. The mechanisms shown, however, will perform their office satisfactorily.

What I claim as new, and desire to secure by Letters Patent, is—

1. In a grain-binder, the combination with a knotter, of mechanism which drives it in one direction only, and stops it when the knotter is in the direction, or nearly so, of the line of discharge, the cord-slot and a finger therein projecting from the side of said slot opposite the knotter, over which finger the twine is laid on the way to the holder, whereby the twine is carried over the end of said finger and to the outer side thereof by the revolution of the knotter, substantially as set forth.

2. The combination substantially as hereinbefore set forth, with the finger lying transversely in the cord-slot, of the knotter and the laterally moving holder.

3. The combination substantially as hereinbefore set forth, with the knotter of the cord-slot extending past said knotter, the fixed stop-finger in said slot adjacent to the knotter, and along and around the end of which the cord is carried by the revolution of the latter, and actuating mechanism which gives the knotter one complete revolution and stops it with its jaws trending in the direction of the extended slot.

4. The combination substantially as hereinbefore set forth, of the knotter, the stop-finger in the cord-slot, and the tucker acting in connection with said finger.

5. The combination substantially as hereinbefore set forth, of the knotter, the stop-finger in the cord-slot, the tucker acting in connection with said finger, and the laterally swinging holder.

6. In a grain-binder, the combination with the breast-plate, provided with the cord-slot extending past the knotter, and a fixed stop-finger in said slot, over the end of and under which the twine is carried by the revolution of the knotter of the knotter having its normal position obliquely, outward across the said finger, mechanism for holding and guiding the twine, for operating the knotter, for cutting the twine, and for discharging the bundle, all substantially as described.

7. The combination substantially as hereinbefore set forth, of the cord-knotter, the slotted breast-plate the swinging arm carrying the holder in its free end, and mechanism whereby said arm is moved laterally away from the cord-slot and obliquely toward and past the knotter-spindle.

8. The combination substantially as hereinbefore set forth, of the cord-knotter, the slotted breast-plate the swinging arm carrying the holder in its free end, and mechanism actuating said arm to move the holder laterally away from the cord-slot and then permitting it to yield at the proper time to deliver slack to the knotter, and mechanism whereby said arm is positively carried back to its starting position.

9. The combination substantially as hereinbefore set forth, of the cord-knotter, the slotted breast-plate, the swinging arm carrying the holder in its free end, and mechanism actuating said arm to move the holder laterally away from the cord-slot and obliquely toward and past the knotter-spindle, and then permitting it to yield at the proper time to deliver slack to the knotter, and mechanism whereby said arm is positively carried back to its starting position.

10. The combination substantially as hereinbefore set forth, of the cord-knotter, the slotted breast-plate, the swinging arm carrying the cord-holder in its free end, mechanism positively actuating said arm to carry the holder laterally away from the cord-slot and obliquely toward and past the knotter-spindle, then permitting it to yield momentarily to deliver slack to the knotter, but afterward restoring it to the extreme of its lateral vibration, and mechanism which positively returns the arm to its primary position at the conclusion of the knotting operation.

11. The combination substantially as hereinbefore set forth, of the cord-knotter, the gear-and-cam-wheel having a segment to operate said knotter, the swinging arm universally supported upon the binder-shaft on the side away from the knotter, the cam-ledge which moves said arm away from the cord-slot in the breast-plate, having a recess corresponding to the moment when the knotter demands slack to allow said arm to momentarily recede, and the opposing cam carried on the binder-shaft to restore said arm to its original position.

12. The combination substantially as hereinbefore set forth, with the pivoted knotter-jaw, of the spring acting to close said jaw, arranged upon the supporting stock with its shank parallel with the spindle of said knotter, and the fixed cam which opens said jaw.

13. In a grain-binder, the combination with the breast-plate provided with the cord-slot extending past the knotter, and with the stop-finger therein, of the knotter having its normal position obliquely outward, across the said finger, and trending lengthwise of the slot, the binder-shaft, the gear-and-cam-wheel upon said shaft, the knotter-spindle mounted in bearings upon the supporting brackets, and stop-motion mechanism revolving the knotter, a fixed cam for opening the jaws of the knotter, and a spring for closing said jaws, said spring being secured to a bearing and lying parallel with and above the knotter-shaft, mechanism for holding the twine for cutting the same, and for discharging the bundle, all substantially as described.

14. In a grain-binder, the combination with a knotter and knotter-shaft, and mechanism for operating the same, of the tucker, operated from the shaft of the knotter, by directly connecting mechanism, substantially as described.

15. In combination with the knotter and knotter-shaft of a twine-binder, and mechanism for operating the same, the vibrating tucker, the crank upon the end of the tucker-shaft, the wrist-wheel upon the end of the knotter-shaft, and the pitman connecting the wrist-pin upon said wheel with the crank on the tucker-shaft.

16. In a twine-binder, the combination with a knotter, mechanism for operating the same, and mechanism for guiding and cutting the twine, of a suspended cord-holder, and mechanism for operating the same from the rotary shaft of the machine, and for imparting to it a reciprocating motion in an oblique direction, all substantially as described.

17. In a grain-binder the combination with a knotter, mechanism for operating the same and mechanism for guiding and for cutting the twine, of the cord-holder, comprising a segmental case and a rotary toothed disk within the same, and mechanism for operating the said cord-holder from the rotary shaft of the machine, and for imparting to it a reciprocating motion in an oblique direction, all substantially as described.

18. The combination substantially as hereinbefore set forth, of a knotter, mechanism for operating the same, mechanism for guiding and cutting the twine, a cord-holder comprising a segmental case and a rotary toothed disk within the same, an arm pivoted to a sleeve upon the binder-shaft, and supporting the holder at its free end, a cam-ledge upon the face of a wheel fast to said shaft, and arranged to swing said arm laterally prior to the knotting action, a cam on the shaft for returning the said arm, oblique guides on the breast-plate to cause said cord-holder to reciprocate in an oblique direction from the cord-slot and mechanism for operating the said cord-holder as it is carried away from the slot.

19. In a grain-binder, the combination with a knotter, mechanism for operating the same, and mechanism for guiding and cutting the twine, of the disk upon the binder-shaft provided with the cam-ledge M, the swinging arm H', connected to the shaft by a universal joint, the cam M' upon the binder-shaft for returning the arm with its attendant parts after it has been thrown outward by the cam-ledge, the cord-holder upon the outer end of the swinging-arm, oblique guides upon the breast-plate, the rack in one of said guides, the cupped and toothed disk with its hollow shaft, receiving the spindle of the holder-disk, the ratchet upon said latter spindle, the pawl pivoted to the cupped disk, and the spring forcing said pawl toward the ratchet.

20. In a grain-binder, the combination with a swinging arm and mechanism for operating the same, of a cord-holder upon the outer end of the said arm, comprising a toothed rotary disk, sitting within a segmental holder which has its sides formed of thin, elastic metal, said holder being adjustably secured to the arm by means of a slotted brace and fastening bolt so as to be set up toward the disk, substantially as described.

21. The combination substantially as hereinbefore set forth, of the slotted breast-plate, a cord-holder frame adapted to move laterally from the slot in the breast-plate, a holder-disk arranged therein in a plane practically at right angles with the breast-plate and having curved or hooked teeth which, when the disk is in its receiving position, project over the cord-slot, and form, in succession, cradles in which the cord is laid by the binder arm.

22. In a twine-binder, the combination with the gear-and-cam-wheel upon the binder-shaft, the knotter and the holder, of the cutter, comprising the knife O, pivoted to a bearing on the machine, provided with an extension to engage with a cam on the periphery of the cam-disk, and mechanism for returning the knife to its normal position when released by the cam, substantially as described.

23. In a twine-binder, the combination with a disk upon the binder-shaft provided with the peripheral cam $o'$ on its periphery, a knotter and mechanism for operating the same, and a cord-holder and mechanism for operating the same, of the cord-cutter, comprising the knife O, pivoted to the bearing of the knotter-shaft, and provided with a backward extension $o$ to engage with the cam and depress the knife upon the cord, and the spring $o^2$ connecting the knife to the breast-plate, for returning it to its normal position, substantially as described.

24. In a twine-binder, the combination with the knotter, mechanism for operating the same, and mechanism for guiding and for cutting the twine, of the gear-and-cam-wheel upon the shaft A, having the lateral cam-ledge provided with the depression $m$, the arm H' connected to the hub of the wheel by a universal joint, the return cam upon the shaft, the cord-holder on the end of the arm, and stop-motion gearing to operate said cord-holder substantially as described.

GEORGE L. PHELPS.

In presence of—
DOUGLAS DYRENFORTH,
CHARLES C. LINTHICUM.